C. C. BRAND.
Bomb Lance.
No. 392. Reissued Aug. 26, 1856.
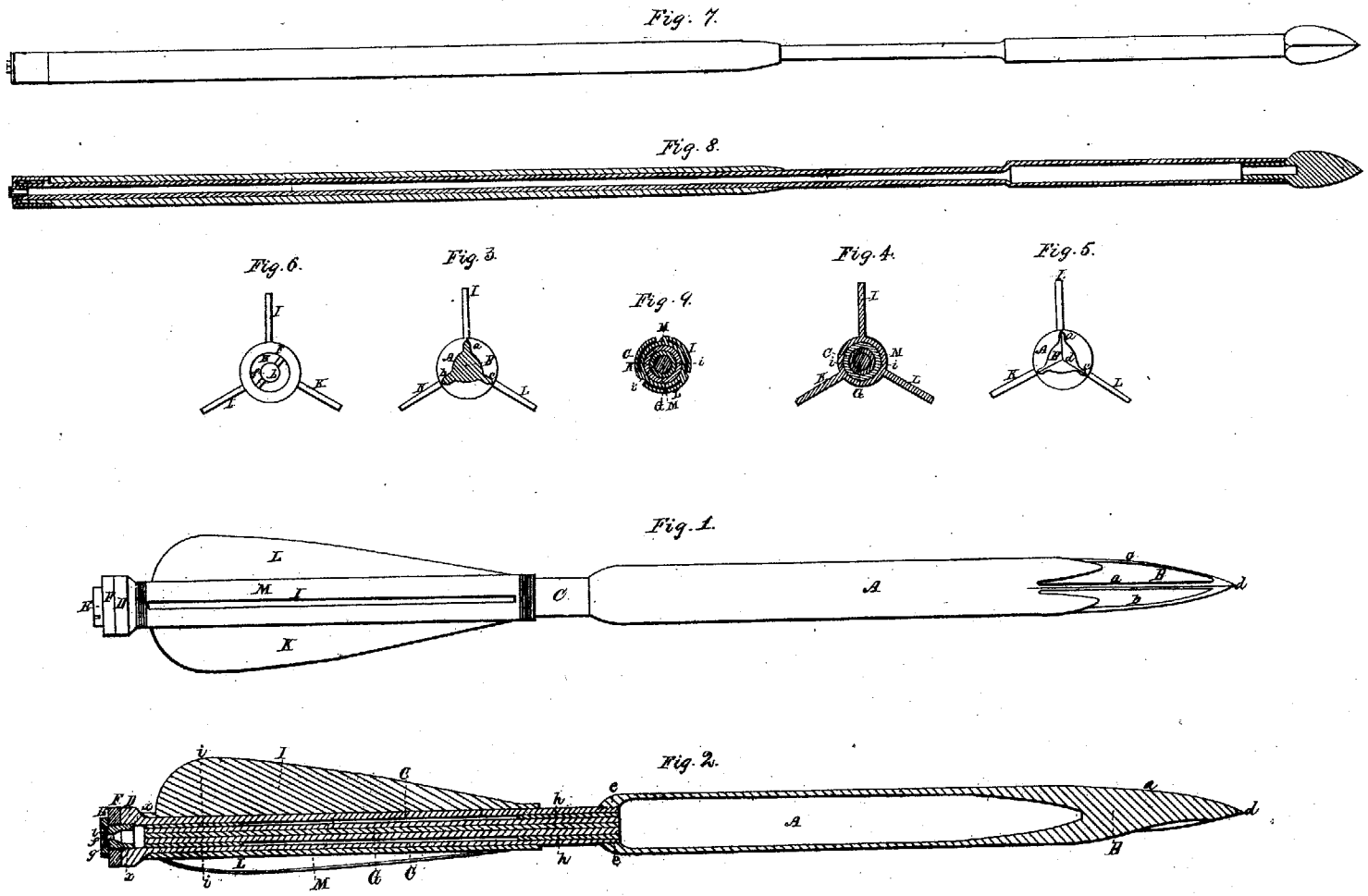
N. PETERS, PHOTO-LITHOGRAPHER, WASHINGTON, D. C.

UNITED STATES PATENT OFFICE.

C. C. BRAND, OF NORWICH, CONNECTICUT.

IMPROVED BOMB-LANCE FOR KILLING WHALES.

Specification forming part of Letters Patent No. 9,047, dated June 22, 1852; Reissue No. 392, dated August 26, 1856.

*To all whom it may concern:*

Be it known that I, CHRISTOPHER C. BRAND, of Norwich, in the county of New London and State of Connecticut, have invented a new and Improved Projectile or Bomb-Lance for Killing Whales or other large animals; and I do hereby declare that the same is fully described and represented in the following specification and accompanying drawings, letters, figures, and references thereof.

Of the said drawings, Figure 1 denotes a side view of my improved bomb-lance. Fig. 2 is a longitudinal section of it. Fig. 3 is a transverse section of its cutting-head or lance-point. Fig. 4 is a transverse section taken through its elastic wings. Fig. 5 is a view of one end of the instrument. Fig. 6 is a view of the other end of it. Fig. 7 is a side view of one of what is usually known as the "Allen bomb-lances." Fig. 8 is a longitudinal section of the said Allen bomb-lance, the said Figs. 7 and 8 being drawn to one-half the scale of the others, as the said Allen bomb-lance is more than twice the length of my improved lance.

The projectile alluded to as the Allen bomb-lance is that invented by Oliver Allen and patented on the 19th day of September, A. D. 1846. It is usually made about three feet and four inches in length, and with a magazine or bomb-tube of about eight inches in length and eleven-sixteenths of an inch in its external diameter and a little over one-half an inch in its internal diameter. The shank or fuse-tube has a cylinder of wood about twenty-two inches in length and seven-eighths of an inch in diameter fixed on it.

Great difficulties have been experienced in the practical operation of the Allen projectile or lance. Generally speaking, it cannot be fired from a gun a distance of over seven rods without deflecting from a straight line. At a distance of ten rods it will almost always turn downward to an angle of about seventy degrees to the horizon. Under such circumstances when the point enters a whale or object the momentum of the shank throws the instrument over so as to either bend or break the fuse-tube and prevent the bomb from entering the animal, or causes it to be torn out.

Having had much practical experience in the construction and use of the Allen projectile, I have been led to study its defects and their causes and to provide a remedy for them. My improved projectile or bomb-lance can be fired from a gun at a distance of twenty-five rods with all the accuracy of a musket or rifle ball. While the Allen lance has its magazine limited in size, (as it cannot be made much larger, as any material increase of the size of the bomb or magazine would require such an increased size of its shank and consequent weight of instrument as to prevent it from being discharged from a gun that can be sustained by a whaleman when held against his shoulder and fired under such circumstances,) mine may be made of a much larger amount of explosive material.

In the figures representing my improved bomb-lance, A exhibits the magazine or part that contains the gunpowder or explosive material. It is about seven inches in length, measuring from the rear part of its lance-head B to the fuse-tube C. The external diameter of the bomb is seven-eighths of an inch and its internal diameter six-eighths of an inch. These dimensions cause it to hold when loaded more than double the amount of gunpowder that is in the charge of the bomb of the Allen.

The lance-head is made with three cutting-edges, *a b c*, and to correspond in shape with that of an engraver's scraper—a tool well known as used by most engravers for scraping copper plates. The knife-edges terminate in a point at *d*, and in their greatest lateral departure from the axis of the instrument they should each not exceed the radius of the cross-section of the bomb, as the whole instrument is to be made to enter the barrel of the gun from which it is to be discharged. The Allen lance usually projects about one-half its length from the gun.

The rear end of the bomb is provided with a female screw made so as to receive a male screw cut on the end of the fuse-tube, as seen at *e*. The said fuse-tube C is about one-half an inch in its external and three-eighths of an inch in its internal diameter. It is to be about seven and one-half inches in length and made to terminate at its outer end in an enlargement or button, D, whose external diameter is made equal to that of the bomb. This enlargement D is made to receive a screw, E, that is screwed into it and against a leather washer, F, which is first placed on the screw and against the rear end of the fuse-tube, and has a diameter which will cause it to closely fit the bore of the barrel of the gun. It is intended that the diameter of said bore shall correspond with that of the bomb, allowance being made for windage, if necessary.

The head of the screw E is provided with a recess, *f*, out of which a touch-hole, *g*, is bored through the screw and in line with its axis. After entering the head a short distance the touch-hole is enlarged for the remainder of the distance, so as to make it in its diameter about equal to that of the fuse-rope G, that is placed within the fuse-tube. The said fuse-rope is of the kind now in general use for blasting rocks. It consists of a tubular rope or cord filled with fuse-powder throughout its length. It is made to extend from end to end of the fuse-tube C, and is held in place within it by two tubular plugs, *h i*, of type-metal, cast within the tube and entirely around the ends of the fuse-rope, as seen at *h i* in Fig. 2. These plugs are each about one inch and a half in length, and are composed of type-metal, or a metal or metallic composition that expands when it cools from a melted state, for it is very necessary that the fuse-rope should be so firmly held in place and that there should be such a partition around it and between it and the interior of the fuse-tube as to prevent the force of the explosion of the charge of the gun from blowing through the fuse-tube, and particularly igniting the charge of the bomb, or so doing before it can be set fire to by the burning of the charge of the fuse.

The force of the explosion of the charge of the gun is often sufficient to move the rearmost plug, *i*, some distance into the fuse-tube. Such rearmost plug thus becomes a protector of the front plug, and prevents the force of the explosion from loosening it or driving it out into the charge of the bomb, so as to allow the fire of the charge of the gun to pass into the charge of the bomb.

From the above it will be seen that the improvement above described consists in so connecting the fuse-rope with the inclosing-tube by encompassing plugs, or equivalent means, as to accomplish results as stated.

Over the touch-hole *g*, and in the recess *f*, I place and cement a thin diaphragm or piece of pasteboard, paper, or other suitable material, *l*, which I cover on its external surface with shellac or other suitable varnish that will prevent moisture or water from getting at the adjacent end of the fuse-rope. This diaphragm should be of such material as will be readily broken through by the fire and explosion of the charge of the gun.

The most important feature of my improved projectile remains yet to be described. It is that by which I am enabled to shorten the instrument, so as to make it of a length about two-fifths of that of Allen, while its shank or fuse-tube is reduced to only about one-fourth the length of that of Allen.

The shank is provided with three elastic wings, I K L, which may be made of vulcanized india-rubber, in order to enable them to withstand the combustible or destructive powers of the explosion of the charge of the gun. They are cemented to a tube, M, of vulcanized rubber, that is constructed to fit and is crowded on the fuse-tube C, and extends from near the rear end of it to near its junction with the magazine or bomb. When the instrument is out of the gun these wings extend out, as seen in Figs. 1, 2, and 4, and in a circle of a diameter entirely beyond that of the magazine or bomb. When inserted in the gun they fold down upon or around the fuse-tube, as seen in Fig. 9, which denotes a cross-section of them and the fuse-tube, showing how they fold down when put in the gun. The requisites of these wings are that they should not only be capable of resisting the destructive powers of the explosion, but of being turned or folded down into a recess or upon the shank, as seen in Fig. 9, in order that they may have such positions when put in the gun, also that they shall possess an elastic property or spring which will cause them, on being released from the gun, to unfold themselves and stand in the positions as seen in Fig. 4.

The wings of bomb-lances or gun-harpoons have been constructed of metal in order that they might be capable of resisting the combustible powers of the charge of the gun; and when so made it will readily be seen that their size, as they were of necessity wholly immovable, was such as would enable the instrument to be inserted in the bore of the gun with the wings in the same position they had during its flight from the gun. This is not so with the wings of my projectile.

The material of which they are made not only enables them to be constructed so much larger in width as to render me able to greatly diminish the length of the shank or fuse-tube, or reduce it to one-fourth that of Allen's bomb-lance, but at the same time to fire the instrument from the gun four times as far as one of Allen's can without deflection.

These very important advantages alone would render my instrument of great value to whalemen, as well as to elephant-hunters; but it possesses many others that give it, I believe, great superiority over every other kind of bomb-lance heretofore used.

What I claim as my invention is as follows:

1. I claim the mode of sustaining the fuse-rope in the fuse-tube, and preventing the fire of the charge of the gun from passing by the fuse-rope and into the bomb—viz., by metal or metallic plugs, or the equivalents thereof, cast around or made to closely encompass the fuse-rope after it has been inserted in the fuse-tube, as specified.

2. I do not claim the application of wings or feathers to a shaft or rod to direct its passage through the air, but what I do claim is, so making or applying them to the shaft-shank, or to the body of the bomb, that not only may they be folded or moved down so as to be capable of entering, with the shaft, the bore of the gun, but each have an elastic property or spring such as will cause it to unfold or be thrown outward immediately after the projectile may be discharged from the gun, such wings being made of vulcanized india-rubber, or any substance or substances which may be deemed an equivalent thereto, inasmuch as such may possess the requisites as above specified.

In testimony whereof I have hereunto set my signature this 31st day of July, A. D. 1856.

CHRISTOPHER C. BRAND.

Witnesses:
R. H. EDDY,
F. P. HALE, Jr.